(12) United States Patent
Gray et al.

(10) Patent No.: US 7,308,089 B2
(45) Date of Patent: Dec. 11, 2007

(54) AVAILABILITY AND LOCATION PREDICTOR USING CALL PROCESSING INDICATIONS

(75) Inventors: Thomas A. Gray, Carp (CA); Ramiro Liscano, Ottawa (CA); Rushabh Gudka, Scarborough (CA); Christian Szpilfogel, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 922 days.

(21) Appl. No.: 10/631,819

(22) Filed: Aug. 1, 2003

(65) Prior Publication Data

US 2004/0028197 A1    Feb. 12, 2004

(30) Foreign Application Priority Data

Aug. 12, 2002   (GB) ................... 0218708.6

(51) Int. Cl.
*H04M 3/42* (2006.01)
(52) U.S. Cl. ................ 379/201.01; 379/201.12; 719/310; 719/313; 717/100; 717/101; 717/103
(58) Field of Classification Search ............ 379/201.01–201.12; 719/310–313; 717/100, 717/101, 103
See application file for complete search history.

(56) References Cited

U.S. PATENT DOCUMENTS

| | | | |
|---|---|---|---|
| 5,920,621 A | | 7/1999 | Gottlieb |
| 5,946,386 A | * | 8/1999 | Rogers et al. ......... 379/265.09 |
| 6,330,325 B1 | * | 12/2001 | Reid et al. ............. 379/265.01 |
| 6,487,290 B1 | * | 11/2002 | Le Grand .............. 379/265.02 |
| 6,678,366 B1 | * | 1/2004 | Burger et al. .......... 379/211.03 |
| 6,700,967 B2 | * | 3/2004 | Kleinoder et al. ....... 379/201.1 |
| 2001/0053214 A1 | | 12/2001 | Kleinoder et al. |
| 2002/0085701 A1 | * | 7/2002 | Parsons et al. ........ 379/211.01 |
| 2005/0246682 A1 | * | 11/2005 | Hines ........................ 717/109 |

FOREIGN PATENT DOCUMENTS

| | | |
|---|---|---|
| EP | 1 161 067 A2 | 12/2001 |
| JP | 4160965 A | 6/1992 |
| JP | 04160965 A | 6/1992 |
| WO | WO 97/39566 | 4/1997 |
| WO | WO 97/39566 A1 | 10/1997 |
| WO | WO 01/60033 A1 | 8/2001 |
| WO | WO 02/054745 A1 | 7/2002 |

* cited by examiner

*Primary Examiner*—Quynh H. Nguyen
(74) *Attorney, Agent, or Firm*—Antonelli, Terry, Stout & Kraus, LLP.

(57) ABSTRACT

A system for generating user availability information from call control events within a telephone system, comprising an Event Queue for receiving and storing call control events from the telephone system, and an Interpretation Engine for accessing the call control events in the Event Queue and in response updating a running sum for the user based on availability evidence ascribed to the call control events, and generating an indication of user availability based on the running sum.

37 Claims, 3 Drawing Sheets

AVAILABILITY AND LOCATION PREDICTOR USING CALL PROCESSING INDICATIONS

BACKGROUND OF THE INVENTION

1. Field of the Invention

This invention relates generally to context-aware call handling in telephone systems, and more particularly to a method and apparatus for generating availability and location predictors using indications generated by call processing actions.

2. Description of the Prior Art

To date, presence and availability capabilities have been confined generally to instant messaging systems such as Microsoft Messenger and ICQ. Users are presented with availability information in the form of buddy lists from which they are able to see which ones of their correspondents are available and attempt to send an instant message to them. The instant message system attempts delivery but there is no ability, such as is provided by call control in a telephony system, to forward the call to another party, take a message, etc. Thus, no solution has been provided in the prior art to the problem of missed calls due to party unavailability.

To be truly useful, availability information must be as current and accurate as possible. In emerging IP telephony systems, where availability information is provided, the indicators of availability are primarily set by the user. The user can set his/her availability to 'At Lunch', 'Be Right Back' etc. This is obviously deficient in the sense that it relies on user action, which may be deferred when the user is concerned with other immediate pressing issues or more commonly when he/she is simply distracted. This often leads to a situation wherein users do not use the such availability notification features since they are not updated often enough to be useful, and they are not updated often enough to be useful because people will not use them.

SUMMARY OF THE INVENTION

The present invention addresses the problem discussed above by making availability generation automatic, rather than based on a required action on the part of the user. In particular, a method of evidence gathering is provided that surmises (i.e. makes guesses) about user availability from his/her interactions with a PBX system. The interactions are gathered as awareness information and processed by an algorithm into availability information. By using awareness information as evidence, the algorithm makes predictions about the users' availability or makes decisions in call processing. This information is fed back into a shared database (e.g. a tuple space) as assertions that indicate high level assessments about the user's state. These assessments are then used by call processing components to make decisions on call handling.

The present invention is an improvement to the invention described in Applicant's copending UK Patent Application No. 0129250.7 entitled Proactive Features for Telephony. In that application, a system is described wherein availability information is presented and the user is provided with a mechanism to switch between multiple 'buddy lists' depending on either his/her express selection or by automatically taking into account his/her current actions. The system according to the present invention extends this concept to provide a set of predictors for availability that use information from call processing actions. Thus, whereas Applicant's prior invention focuses on the receiver of presence information, the present invention focuses on the generation of presence information.

Applicant's copending patent application filed on the same date as this application and entitled "Architecture and Implementation for Control of Context Aware Call Processing with Local Feature Definition", discloses a generic call processing architecture in which operation of the system is divided into three main activities—context update, feature selection and feature execution. The system according to the present invention is implemented within the context update portion of Applicant's architecture. Specifically, events from call processing are used to update information on the location and availability of users. This information may be sent to other users or sent to the feature selection component of Applicant's disclosed architecture to be used as part of the context evaluated when selecting a feature.

BRIEF DESCRIPTION OF THE DRAWINGS

A detailed description of the invention is set forth herein below, with reference to the following drawings, in which.

DETAILED DESCRIPTION OF THE PREFERRED EMBODIMENT

Figure 1:
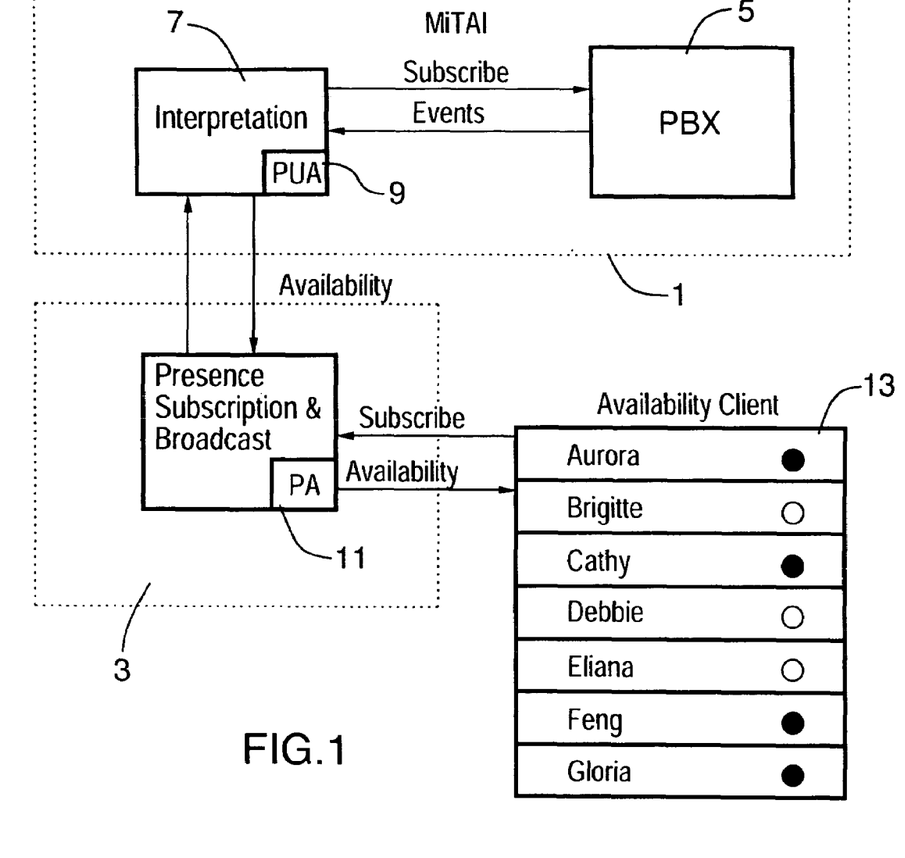
FIG. 1 is a block diagram of an Internet telephony system according to the present invention for generating availability indicators from call control policies and awareness data.

FIG. 1 is a block diagram of a system according to the present invention for combining call processing via call control 1 with a presence system 3. A PBX 5 provides conventional active call control functions as well as newly enabled applications that rely on presence information. More particularly, PBX 5 is enabled with an HCI application by which external applications may be made aware of call control events which may occur in respect of any number of specific subscribers. For example, PBX 5 may be one either a Mitel 3200 or 3300 ICP with MiTAI interface. Interpretation block 7 contains an application that subscribes to these call control events to provide an indication of user availability. Thus, the presence information used by call control 1 is generated both by its own actions and from information generated by presence system 3. Information from these two sources is combined for individual users in the Interpretation block 7. In IETF terms, this functions as PUA 9 (Presence User Agent), which derives presence information from user activities to create an indication of availability for individual users that is stored in an internal database.

Thus, the Interpretation block 7 is integrated with real time call control. In terms of the call control architecture set forth in Applicant's copending patent application entitled "Architecture and Implementation for Control of Context Aware Call Processing with Local Feature Definition", this functionality falls within the category of context update activity by providing call control with context information for feature selection. This functionality also operates via the PUA 9 to generate presence and availability indications for the presence system 3.

The presence system 3 provides presence subscription and broadcast functionality to accept, authenticate and authorize subscription requests for presence information. In IETF terms, the PA 11 (Presence Agent) provides a service whereby external clients can subscribe to the availability information provided by the PUA 9. The PA 11 is responsible for the authorization of subscriptions from these external clients. In the example described herein below, an implementation is set forth using the well-known IETF protocol SIP.

An external client (Availability Client 13) is shown for subscribing to the availability information of personal correspondents of interest to a particular user. In the example of FIG. 1, there is an indication that Aurora, Cathy, Feng and Gloria are available for conversations while Brigitte, Debbie and Eliana are not. This is similar to the availability indications given in Applicant's copending Patent Application No. 0129250.7 entitled Proactive Features for Telephony.

It will be noted that there is effectively a feedback control loop for the user between the presence application 3 and call control 1. The user is able to use his/her presence indications to direct the operation of call control features. Call processing indicators of availability are derived from the programming and operation of call control features for the user. As discussed below, the programming of certain features gives an absolute indication of a user's availability, whereas other features give no certain indications when they are programmed but give 'evidence' directly when they are triggered.

Two examples of common call-processing features that give an absolute indication of a user's unavailability are Do-Not-Disturb (DND) and Call-Forward-Always-to-Voice-Mail (CFAVM). Both features prevent an incoming caller from synchronously connecting at any time with the user, thereby providing clear indications of unavailability.

Other examples of features that give indications of unavailability are:
Call-Forward-No-Answer (voice mail)
Directed Call Forward
Abandoned Incoming Call Examples of features that give indications of availability are:
Off Hook
Answered Call Forward Always, No Answer or Busy (non voice mail)

Table 1 is a list of the indicators used in the development of a working prototype of the invention. It will be appreciated that this list is exemplary only, and therefore non-exhaustive.

TABLE 1

| List of Indicators Used in Prototype | | |
|---|---|---|
| Event | Change in Evidence | Availability |
| DND on | No Evidence Change | Off |
| DND off | Evidence Up | Evidentiary |
| CF of any type Disable | Evidence Up | Evidentiary |
| CFA Voicemail Enable | No Evidence Change | Off |

TABLE 1-continued

| List of Indicators Used in Prototype | | |
|---|---|---|
| Event | Change in Evidence | Availability |
| CFNA | Evidence Up | Evidentiary |
| CFNA Voice | Evidence Down | Evidentiary |
| CFNA Non Voicemail | Evidence Down (if not answered)/ Up(answered) | Evidentiary |
| On Hook | No Evidence | Evidentiary |
| Off Hook | Evidence Up | Off |
| Abandoned Incoming Call | Evidence Down | Evidentiary |

Three absolute indictors are included in Table 1: DND On, CF always and Off Hook. It will be noted that Off Hook is a hybrid indicator in that if a user is Off Hook, the user is obviously unavailable to take other calls. However the Off Hook event builds up evidence of availability since the user must be at his/her desk in order to go Off Hook. Thus, when the user goes back On Hook the evidence gathered during the Off Hook period becomes relevant to the user's indicated availability. Of the absolute indicators shown in Table 1, only Off Hook is incremental. All others are discreet.

Contextual indicators are used in the system according to the invention to control the default value to which the running sum of evidentiary evidence decays in the absence of evidence. This default value can be set either high of low in order to bias the decision on availability to an expected state. For example, the default value can be set low during periods when the user is expected to be away (e.g. during the night, during meetings (derived from the user's calendar), or higher during times in the user's business day when he/she has no meetings scheduled. One example of a list of indicators for controlling the default value is set forth in Table 2:

TABLE 2

| Off Hours | Low |
|---|---|
| Lunch Time | Neutral |
| Business Hours | High |
| Vacation | Low |
| Meeting | Low |
| . . . | . . . |

This default value can be set to high, low or neutral (0) in order to bias the decision on availability to an expected state.

Figure 2:
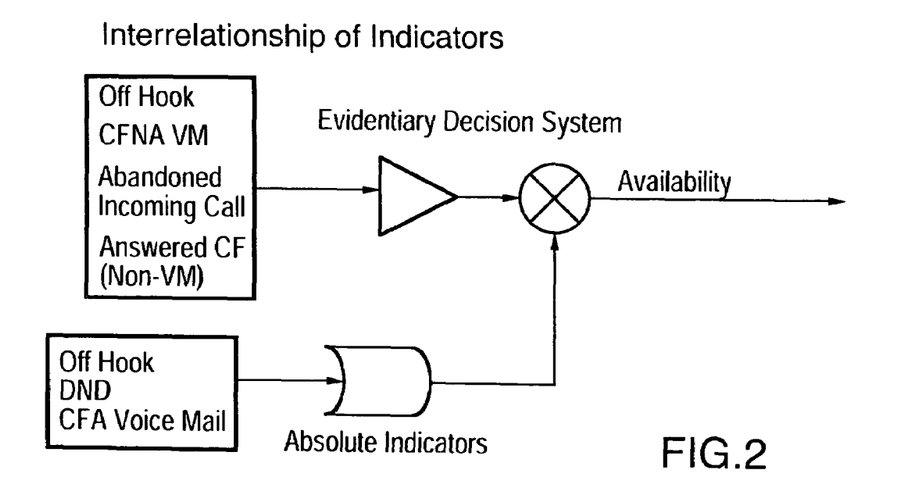
FIG. 2 is a schematic diagram showing how evidentiary and absolute indicators are composed according to the present invention.

FIG. 2 is a schematic diagram showing how evidentiary and absolute indicators are composed. The specific symbols used in FIG. 2 are non-standard and are used only to give an illustration of how the composition is performed. The triangle is used as an indication that evidence from the occurrence of the evidentiary features is gathered and summed in a decision system as described in detail below. The output of the evidentiary system may be any one of available, unavailable or undetermined.

The absolute indicators may also have the availability values described above. However, since they are definitive they are shown connected to a block that is used to indicate that they may be used to absolutely control the value of availability reported. It will be noted that Off Hook appears in both blocks because, even though it is an absolute indication of availability, it also provides incremental evidence?

The evidence gathered by the system according to the present invention relates to the occurrence of events in call processing. Some of this evidence is definitively gathered when the event occurs (referred to herein as 'discreet evidence'). Other evidence depends on the duration of occurrence of an event (referred to herein as 'incremental evidence'—one example being Off Hook).

Figure 3:
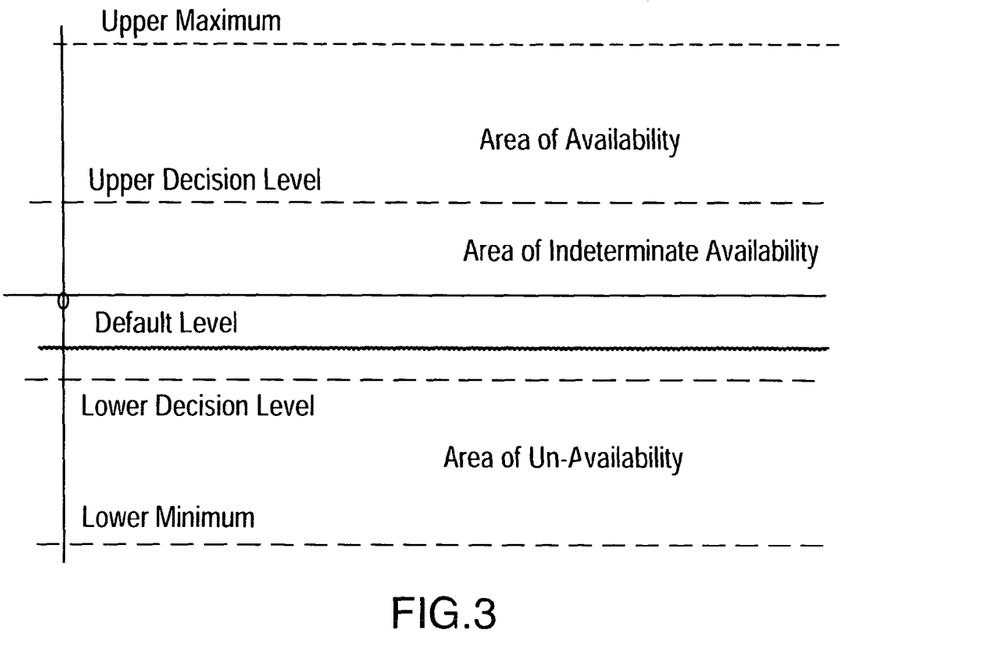
FIG. 3 shows the coordinates of a graph to indicate user availability based on call control events, where availability is predicted using the system according to the present invention to be within areas bounded by predetermined levels.

The evidentiary system of the present invention implements a running sum whose value is determined by increments that are based on the occurrence of call control events. The sum is compared against various levels as shown in FIG. 3 (i.e. an upper maximum and a lower minimum which, for simplicity, are shown as being symmetrical around zero).

There are three regions for the sum, which determine the decision output of the system. If the sum is above the Upper Decision Level, it is in the Area of Availability and the user is considered to be available. If the sum is below the lower decision level, the sum is in the Area of Un-Availability and the user is considered to be unavailable. If the sum is between these two values, it is considered to be in an Area of Indeterminate Availability and the availability of the user cannot be decided.

Figure 4:
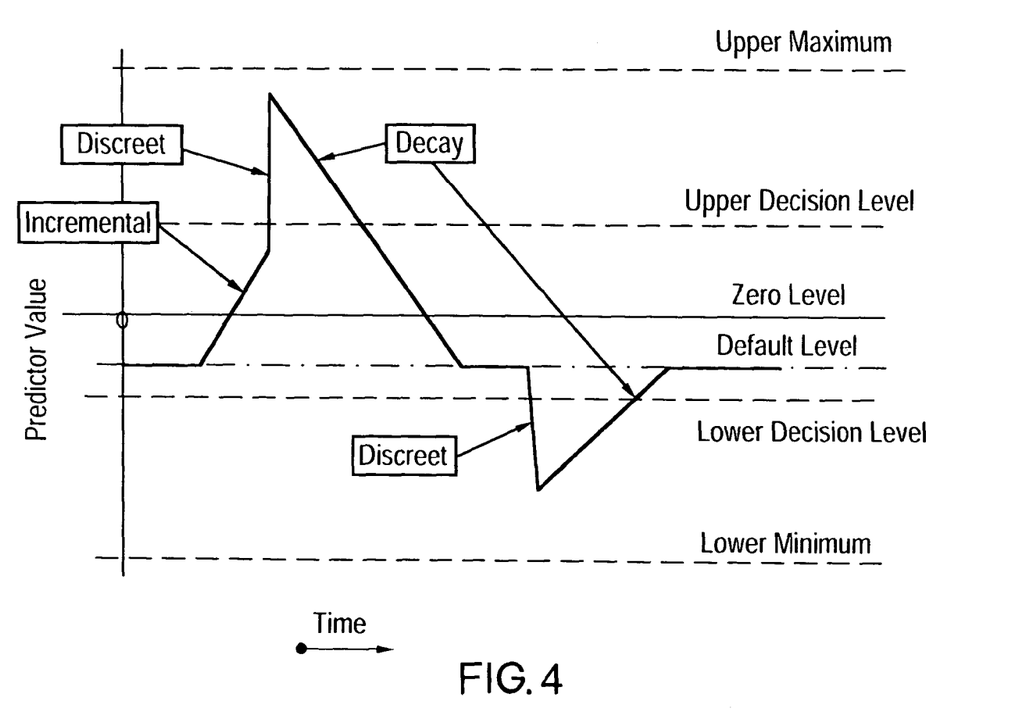
FIG. 4 is a graph of an example indication of user availability using the coordinates and regions of FIG. 2, based on an example sequence of call control events.

FIG. 4 shows the operation of the evidentiary decision system for exemplary values of input. It will be noted that the default value of the system has been set to below zero. This biases the system decision towards unavailability although, as shown in the diagram, without evidence the value at initiation creates an output of indeterminate availability.

From FIG. 4, it can be seen that the system initially starts with no evidence. At some time later, a piece of incremental evidence is received (e.g. the user goes OFF HOOK). This evidence points to availability such that the sum is incremented at a steady rate through time towards the upper maximum. Some time later a piece of discreet evidence is received (e.g. an answered Call Forward Always to a non-voice mail number). This causes the sum to be increased immediately by a discreet amount. This increase takes the sum above the upper decision level such that the availability indicator report changes from indeterminate to available. If call control activity indicates that the user is available, the assumption of availability can be extended to an assumption that if the user is available now, he/she will be available for a further period of time. Thus, for the period following increase of the sum as a result of having received discreet evidence of availability, FIG. 4 shows a gradual decay at a specific rate to the default value. This rate is chosen so that the availability state is maintained for a predetermined period of time.

Eventually, the sum decays below the upper decision value thereby causing the prediction to change to indeterminate. The sum value continues to decay to the default value, where it where it remains in the absence of evidence, as indicted in FIG. 4.

Some time later a piece of discreet evidence of unavailability is received (e.g. an unanswered incoming call). This results in the sum being further immediately decreased by a specific amount to below the lower decision level, causing the output to change to unavailable. In the absence of further evidence the sum increases incrementally (i.e. reverse decay) towards the default value which, as discussed above, causes the availability status to change to indeterminate.

Figure 5:
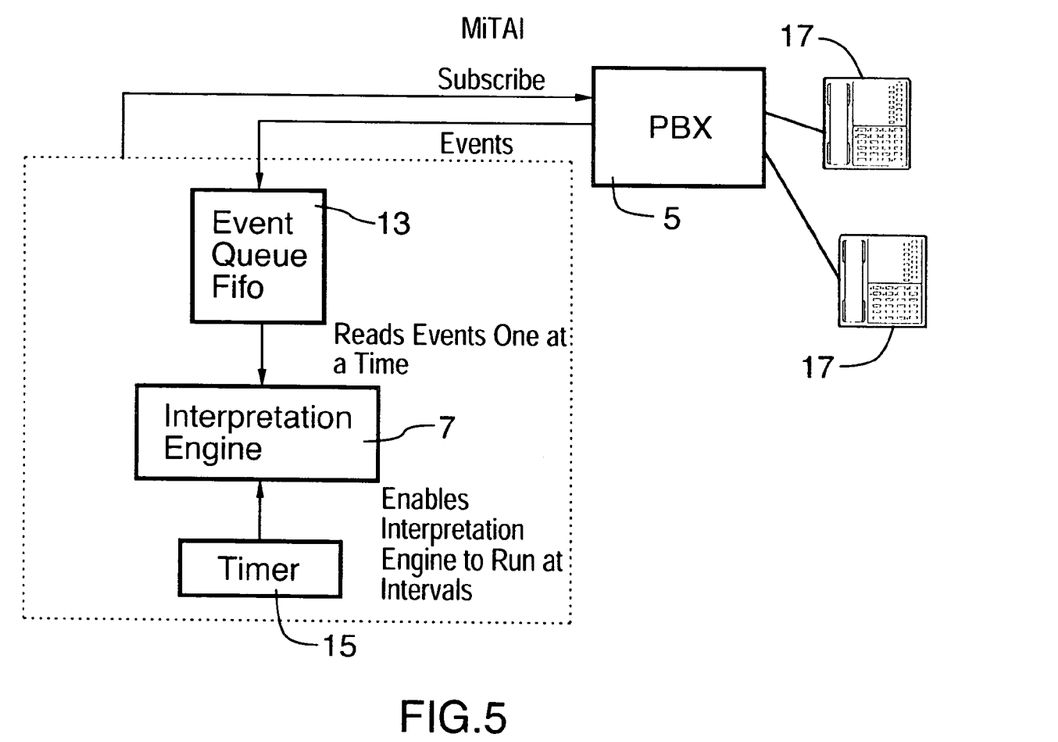
FIG. 5 is a block diagram showing interpretation of incoming events from a PBX in the system of FIG. 1.

Returning briefly to FIG. 1, in conjunction with FIG. 5, within the PUA 9 there are two main processes, each with associated data components. The Event Queue 13 operates asynchronously to gather call control events from the PBX 5. For each of the presentities that supply availability information ('presentity' is a term used in the art to describe an entity that supplies presence information to external clients), the Event Queue creates the appropriate MiTAI subscriptions. The Event Queue 13 is thereby connected via a standard socket to the MiTAI application on the PBX 5 and thereafter asynchronously collects call control events from the PBX and stores them as strings.

The Interpretation Engine 7 works synchronously on a regular interval (e.g. 1 second) in accordance with a timer 15. It effectively runs once each such time interval and blocks on the expiration of the timer when it completes its operation, as discussed in greater detail below. The Interpretation Engine 7 contains multiple associated data structures with for each presentity. The data structure for each presentity contains:

Running_Sum—an integer that contains the value of the current evidentiary sum, ranging from positive maximum to negative maximum Default_Value—an integer ranging from positive maximum to positive minimum to which Running_Sum decays in the absence of evidence.

Availability—a string containing the current interpretation of the availability of the presentity. There are three values—Available, Unavailable, and Indeterminate Absolute_or_Evidentiary—a boolean indicating which sort of indicator is currently controlling the availability state of the presentity. A value of 1 indicates control by an absolute indicator. A value of zero indicates control by evidentiary indicators Absolute_Indicator—a Boolean indicating the type of absolute indicator last seen. A value of 1 is a positive indicator of availability and 0 is a negative indicator of availability.

Off Hook_State—a Boolean indicating whether the presentity is off hook or not. A 1 indicates that the presentity is currently considered to be off hook.

The following pseudocode describes the reception and interpretation of events from the PBX 5.

Event_Queue asynchronously receives events from the MiTAI application of the PBX
When timer on which the Interpretation_Engine is blocked-expires
Interpretation_Engine sets timer to its default period
For all events in the Event Queue,
Retrieve the event from the bottom of the queue
If the queue is empty
Block engine on its timer
From information in the event string determine the presentity for which it is concerned and access the data structure for that presentity
If the event indicates transition to an off hook state
Set the Off-Hook State Flag
If the event indicates transition to an on hook state
Re-set the Off_Hook state flag
If the event indicates enabling of an absolute indicator
Set the Absolute_or_Evidentiary indicator to indicate an absolute indicator
Set the Absolute_Indicator flag to indicate the type of absolute indicator, either positive or negative
If the event indicates the disabling of an absolute indicator
Set the Absolute_or_Evidentiary indicator to indicate an evidentiary indicator
If the event indicates a piece of discreet evidence of availability
Increment the Running_Sum towards the maximum value by the standard value used for discreet evidence.
Note that in the case of diverted calls (answered forwarded calls for example) the evidence is indicative of the availability of the presentity from which the call was forwarded. In that case the Running_Sum should be incremented for that presentity If the event indicates a piece of discreet evidence of unavailability
  Decrement the Running_Sum towards the minimum value by the standard value used for discreet evidence
    Note that in the case of diverted calls (abandoned forwarded calls for example), the evidence is indicative of the unavailability of the presentity from which the call was forwarded. In that case, the Running_Sum should be decremented for that Presentity.

When the queue is exhausted
For all presentities being monitored
If the Off_Hook_State is set to 1,
  Increment the Running_Sum towards the maximum value
Else
Decrement the Running_sum towards the default value
Check the state of the Absolute_or_Evidentiary Flag
If the state of the Absolute_or_Evidentiary Flag indicates the observation of an absolute event
  Set the value of the Availability string to the value indicated by the Availabilty_Indicator flag (i.e. set the Availability to available for positive absolute indicators and to Unavailable for negative indicators)
Else, since there is no specific feature indicating an absolute indicator, check the value of the Off_Hook_State, (an off hook line is considered to unavailable)
  if Off_Hook_State is not set
    Check value of the Running_Sum
      If Running_Sum is above the upper decision level
        Set Availability to Available
      If Running Sum is equal to or less than the lower decision level
        Set Availability to Unavailable
      If Running Sum is greater than the lower decision level and less than the upper decision level
        Set Availability to Indeterminate
  If Off_Hook_State is set then set the value of the Availability string to Unavailable When the foregoing has been accomplished for all presentities, the engine 7 will block on its timer 15.

The foregoing is a description of the process underlying the operation of the system. The pseudocode description is general, in order to provide a clear explanation of the process. In the particular implementation according to a working prototype of the invention, the Mitel Networks CTI protocol MiTAI was used to set monitors on the operations of specific line circuits connected to devices 17 within the ICP (i.e. PBX 5).

The following additional elements of the data structure are used in the descriptions of the interpretations of the MiTAI event strings by the Interpretation Engine 7 for the actual MiTAI implementation.
  Voice_Mail_Number: a string containing the directory number of the voice mail service for this presentity
  Diverted—a boolean indicating that the call has been diverted to this directory number from another
  Diverted_Number—a string containing the directory number of the device from which the call, has been diverted
  Established—a boolean indicating that a call has been established.

The events subscribed to and how these particular events were interpreted in the MiTAI implementation are as follows:

For each of the monitored devices, subscriptions for seven events were set. These were:
1. CallOriginatedEvent: a call attempt is being made on this device.
2. CallClearedEvent: an existing call on a device has ended
3. CallDivertedEvent: a call sent to this device has been diverted to another device
4. CallReceivedEvent: a call attempt is being made to the device. It is in a state of ringing
5. CallEstablishedEvent: a call attempt has been successful and the device has moved from the ringing state to the established state
6. ForwardFeatureEvent: a forwarding feature has been activated on the device
7. ActivateFeatureEvent: a feature has been activated on the device These events are interpreted within the Interpretation Engine 7 to gather evidence of availability or unavailability which are then added to the Running_Sum for each of the devices.

In operation MiTAI monitors in the ICP (PBX 5) forward notifications of these events to the Event Queue 13 in the form of strings of the form:

Event Strings from MiTAI

The following are example of strings received from the MiTAI implementation for these various events. Explanations are provided for only the salient portions of each event:

CallReceivedEvent

For the CallReceivedEvent there are two cases of interest. The first is for a call that was intended for the device that is being monitored. The second is for a call that was diverted to this device from another device. Examples are given below.

Call Intended for this Device:

A new call received by extension 4024 dialed from 4001:
| CallReceivedEvent | ReceivedState | NewCall |
|---|---|---|
| callid=69 | hmonitor_obj=11147604 | Wed |
|  | number=303 | Mar 13 16:46:07 | caller: 4001
CallingDevice Msg:
dialed 4igits: 4024
origin:
ODD Msg:

Call Diverted to this Device

Received a call on device 4023 dialed from 4001 and intended for 4024
| CallReceivedEvent | ReceivedState | DivertedNoAnswerFrom |
|---|---|---|
| callid=79 | hmonitor_obj=11147604 | Wed |
|  | number=371 | Mar 13 16:50:12 | caller: 4001
CallingDevice Msg:
dialed_digits: 4024
origin: 4024
ODD Msg:
CallDivertedEvent Call diverted from 4024 to 4101
| CallDivertedEvent | IdleState | DivertedNoAnswerAway |
|---|---|---|
| callid=69 | hmonitor_obj=11147604 | Wed |
|  | number=313 | Mar 13 16:46:22 | newdest: 4101

-continued

The important aspects of this event string are:
newdest is the directory number of the device to which the call is sent
CallEstablishedEvent Call was answered by extension 4023
CallEstablishedEvent          EstablishedState       AnswerInvoked
callid=79                     hmonitor_obj=11147604  Wed
                              number=380             Mar 13 16:50:14
connect: 4001
control:
control: 4023
CallClearedEvent Note the identity of the device for which this event was received is not
apparent in the event string. It can be derived from the parameters of the
call back method that delivers the string.
CallClearedEvent              IdleState              ClearInvoked callid=3                      hmonitor_obj=11147604  Mon
                              number=12              Jul 08 09:30:55
Worktimer is Not Active
CallOriginated Event
Note the identity of the device for which this event was received is not
apparent in the event string. It can be derived from the parameters of the
call back method that delivers the string.
CallOriginatedEvent           OriginatedState        NewCallInvoked
callid=5                      hmonitor_obj=11147604  Mon
                              number=15              Jul 08 09:32:30
Worktimer is Not Active
ForwardFeatureEvent Call Forward Always feature to extension 4023 was enabled
ForwardFeatureEvent           FeatureEnabled         CFAlways
hmonitor_=11147604 number=394                        Wed
                                                     Mar 13 16:53:07
device: 4001
forwarding destination: 4023
Forward No Answer feature to destination 4101 was disabled
ForwardFeatureEvent           FeatureDisabled        CFNoAnswer
                                                     Internal
hmonitor_obj=11147604 number=395                     Wed
                                                     Mar 13 16:53:41
device: 4001
forwarding destination: 4101
ActivateFeatureEvent Do No Disturb Feature on extension 4024 was enabled
ActivateFeatureEvent          FeatureEnabled         DoNotDisturb
                                                     Feature
hmonitor_obj=11147604 number=397                     Wed
                                                     Mar 13 16:54:43
device: 4024

The actions taken upon the reception of each MiTAI event string will now be described.

CallReceivedEvent:

When this event is received the Established boolean is reset to indicate that a call has been received for this presentity but not yet established.

The Interpretation Engine 7 then checks to see if the call has been diverted or not by examining the string to see if it is a new or diverted call.

In the case of a new call, the Diverted boolean in the data structure for the presentity is set to 0.

In the case of a diverted call, the Diverted boolean is set to 1 and the Diverted_Number string is set to the string found in the dialed_digits field of the message.

CallDivertedEvent

When this event is received, the only point of interest for this invention is whether the call has been diverted to the voice mail number for this presentity. The value of the string found in the Voice_Mail field of the data structure is compared to the string found in the newdest filed of the message. If these are the same then the call has been diverted to voice mail. This is interpreted as discreet evidence that the user is unavailable and the discreet standard value is subtracted from the Running_Sum for this presentity.

CallEstablishedEvent

The call has been answered. Several actions are taken:

The Established boolean is set.

This event is interpreted as an indication that the device is off hook and the off hook flag is set.

The Diverted boolean is examined, if it is set to one then this is taken as an indication that a forwarded call has been answered. This is evidence for the availability of the presentity that has forwarded the call. The Running_Sum for the presentity that forwarded the call is incremented by the standard discreet amount. The identity of the presentity that forwarded the call is found in the Diverted_Number string in the data structure, having been set to the correct value by the handling of the Call_Received_Event CallOriginatedEvent This is interpreted as an off hook and the off hook flag for this presentity is set.

CallClearedEvent

The Established boolean is checked. If it has been set, then this event is an indication that an established call has ended. This is interpreted as an on hook indication and the off hook flag for this presentity is reset If the Established boolean has not been set, this will be taken as an indication that the incoming call has been abandoned (i.e. an indication of the unavailability of the presentity for this device). The standard discreet amount is subtracted from the Running_Sum of this presentity.

In addition, the Diverted boolean is checked. If it is set then the call has been diverted and the abandonment is interpreted as unavailability for the forwarding presentity. The Diverted_Number string in the data structure will contain the directory number of the forwarding presentity (as set by the CallReceivedEvent) and the Running_Sum for this presentity is decremented by the standard discreet amount.

ForwardFeatureEvent

This event indicates the enabling or disabling of a forwarding feature. For the purposes of the present invention the only events of interest are the enabling and disabling of Call Forward Always to the voice mail number for this presentity.

Initially the type of forwarding feature will be checked. If it is Call Forward Always (CFAlways in the string), the value of the field in the forwarding destination field is examined. If this is the same as the string in the Voice_Mail field of the data structure for this presentity, the event string is checked to see if the feature is being enabled or disabled. If the Call Forward Always feature is being enabled, this will be taken as an absolute indication of user unavailability. The Absolute_or_Evidentiary flag is then set to indicate an absolute indicator. The Absolute_Indicator boolean is set to 0 to indicate unavailability. If the feature is being disabled, this will be taken as the disabling of an absolute indicator. The Absolute_or_Evidentiary flag is therefore set to indicate an evidentiary indicator. It will also be taken as a discreet indication of user availability and the standard discreet amount is added to the Running_Sum for this presentity.

ActivateFeatureEvent

This event indicates the enabling or disabling of a feature. For the purposes of the present invention the only feature of interest is Do Not Disturb.

Initially, the type of feature is checked. If it is Do Not Disturb (DoNotDisturbFeature in the string), then whether it is being enabled or not is determined. If it is being enabled this will be taken as the enabling of an absolute indicator. It will be taken as an absolute indication of unavailability. The Absolute_or_Evidentiary flag is set to indicate an absolute indicator. The Absolute_Indicator flag is set to 0 to indicate unavailability If the Do Not Disturb feature is being disabled, this is taken as an indication of the disabling of an absolute indicator and as a piece of discreet evidence that the user is available. The standard discreet amount is therefore added to the Running_Sum for this presentity. The Absolute_or_Evidentiary flag is set to indicate an evidentiary indicator Modifications and variations to the invention are possible. For example, it will be appreciated by a person skilled in the art that the activities discovered by the evidentiary indicators are also indications of location. Thus, indications of activity at the user's desk can be used to predict the user's presence at that location. Answered call forwards are also indicators of availability. If they are eliminated from consideration in the running sum, then the sum becomes an indication of location. Similarly, answered call forwards can be combined in another sum to indicate presence at that location.

Certain additional indicators may also be used to give a general but not conclusive indication of user availability. These indicators may be used to bias the evidentiary process into giving a prediction of availability that may be overcome by further evidence. For example, time of day may be used an indicator of this type. Thus, for example, during business hours the evidentiary decision system may be biased to predict that the user is available or perhaps more likely than not to be available. The opposite may be assumed outside of normal business hours.

Inherent in this disclosure is the assumption that parties other than the user will subscribe to the user's availability. However if the user either voluntarily or automatically subscribes to his/her own availability as perceived by this system, the user will be encouraged to set the availability to the correct value (i.e. an absolute value of availability). This will encourage use of the system by making users aware of it and by also encouraging the provisioning of more accurate values.

The value of the running sum can also be used as an indicator of the confidence level that the system has in the decision that it has made. Decision levels relative to the default value can be supplied which can be used to indicate whether the system is confident, not confident, very confident, etc. in the decision. This, in turn, can be supplied as another value to the subscriber.

Instead of providing a subscriber with a decision on availability, it is contemplated that the subscriber be supplied with an indication of whether or not there is an absolute indicator what its value (available or unavailable) is. Alternatively, the value of the running sum can be provided to give an analog indication of the confidence that the system has in the user's availability.

All such modifications and variations are believed to be within the sphere and scope of the present invention as defined by the claims appended hereto.

The invention claimed is:

1. A method of generating user availability information from call control events within a telephone system, comprising:
  receiving call control events from said telephone system, wherein each of said call control events is ascribed one of either an absolute indicator of availability or evidence of availability;
  for each of said call control events to which said absolute indicator of availability has been ascribed generating an indication of said user availability based thereon, and otherwise generating said indication of user availability on said evidence of availability; and
  updating a running sum for said user based on said evidence of availability, and wherein said indication of user availability is generated based on said running sum; and wherein
  said running sum is updated by a discrete amount in response to call control events characterized by discrete evidence of availability and by incremental amounts in response to call control events characterized by incremental evidence of availability, whereby said indication of user availability is maintained for a predetermined period of time in the absence of further call control events.

2. A method as claimed in claim 1, wherein said running sum is prevented from being updated by said incremental amounts beyond a predetermined default value.

3. A method as claimed in claim 2, wherein said indication is 'available' in the event said running sum exceeds a predetermined upper decision level, 'unavailable' in the event said running sum is below a predetermined lower decision level, and 'indeterminate' in the event said running sum is intermediate said predetermined upper and lower decision levels.

4. A method as claimed in claim 2, wherein said absolute indictor of availability is one of either 'available' or 'unavailable'.

5. A method as claimed in claim 2, further including the step of generating an indication of said user location based on location information in said call control events.

6. A method as claimed in claim 3, wherein said default value is selected to bias said running sum toward said lower decision level.

7. A method as claimed in claim 3, further including the step of generating an indication of said user location based on location information in said call control events.

8. A method as claimed in claim 6, further including the step of generating an indication of said user location based on location information in said call control events.

9. A method as claimed in claim 1, further including the step of generating an indication of said user location based on location information in said call control events.

10. A method as claimed in claim 1, further including the step of generating an indication of said user location based on location information in said call control events.

11. The method of claim 1, further comprising displaying said indication of user availability to said user.

12. A system for generating user availability information from call control events within a telephone system, comprising:
  an event queue for receiving and storing call control events from said telephone system, wherein each of said call control events is ascribed one of either an absolute indicator of availability or evidence of availability; and an interpretation engine for accessing said call control events in said event queue and for each of said call control events to which said absolute indicator of availability has been ascribed generating an indication of said user availability based thereon, and otherwise generating said indication of user availability on said evidence of availability; and wherein said interpretation engine generates said indication of user availability based on a running sum that is updated based on said evidence of availability; and said interpretation engine updates said value by a discrete amount in response to call control events characterized by discrete evidence of availability and by incremental amounts in response to call control events characterized by incremental evidence of availability, whereby said indication of user availability is maintained for a predetermined period of time in the absence of further call control events.

13. A system as claimed in claim 12, interpretation engine prevents said running sum from being updated by said incremental amounts beyond a predetermined default value.

14. A system as claimed in claim 13, wherein said interpretation engine generates an indication of 'available' in the event said running sum exceeds a predetermined upper decision level, 'unavailable' in the event said running sum is below a predetermined lower decision level, and 'indeterminate' in the event said running sum is intermediate said predetermined upper and lower decision levels.

15. A system as claimed in claim 13, further including the step of generating an indication of said user location based on location information in said call control events.

16. A system as claimed in claim 14, wherein said default value is selected to bias said running sum toward said lower decision level.

17. A system as claimed in claim 14, further including the step of generating an indication of said user location based on location information in said call control events.

18. A system as claimed in claim 16, further including the step of generating an indication of said user location based on location information in said call control events.

19. A system as claimed in claim 12, further including the step of generating an indication of said user location based on location information in said call control events.

20. A system as claimed in claim 12, further including the step of generating an indication of said user location based on location information in said call control events.

21. The system of claim 12, wherein said interpretation engine displays said indication of user availability to said user.

22. A method of generating user availability information from call control events within a communication system, comprising:
  receiving call control events from said communication system;
  deriving indications of availability from said call control events; and
  generating user availability information based on said indications of availability;
  ascribing one of an absolute indicator of availability and evidence of availability to each of said call control, and for each of said call control events to which said absolute indicator of availability has been ascribed, generating an indication of said user availability based thereon, and otherwise generating said indication of user availability on said evidence of availability;
  updating a running sum for said user based on said evidence of availability, and wherein said indication of user availability is generated based on said running sum and said running sum is updated by a discrete amount in response to call control events characterized by discrete evidence of availability and by incremental amounts in response to call control events characterized by incremental evidence of availability;

whereby said indication of user availability is maintained for a predetermined period of time in an absence of further call control events.

23. A method as claimed in claim 22, wherein said running sum is prevented from being updated by said incremental amounts beyond a predetermined default value.

24. A method as claimed in claim 23, wherein said indication is 'available' in the event said running sum exceeds a predetermined upper decision level, 'unavailable' in the event said running sum is below a predetermined lower decision level, and 'indeterminate' in the event said running sum is intermediate said predetermined upper and lower decision levels.

25. A method as claimed in claim 24, wherein said default value is selected to bias said running sum toward said lower decision level.

26. A method as claimed in claim 23, wherein said absolute indictor of availability is one of either 'available' or 'unavailable'.

27. A method as claimed in claim 23, further including the step of generating an indication of said user location based on location information in said call control events.

28. A method as claimed in claim 22, further including the step of generating an indication of said user location based on location information in said call control events.

29. A method as claimed in claim 22, further including the step of generating an indication of said user location based on location information in said call control events.

30. The method of claim 22, further comprising displaying said user availability information to said user.

31. A system for generating user availability information from call control events within a telephone system, comprising:
  an event queue for receiving and storing call control events from said telephone system; and
  an interpretation engine for accessing said call control events in said event queue, deriving indications of availability from said call control events, and generating user availability information based on said indications of availability; and wherein said interpretation engine ascribes one of an absolute indicator of availability and evidence of availability to each of said call control, and for each of said call control events to which said absolute indicator of availability has been ascribed, generates an indication of said user availability based thereon, and otherwise generates said indication of user availability based on said evidence of availability;

said interpretation engine generates said indication of user availability based on a running sum that is updated based on said evidence of availability; and said interpretation engine updates said running sum by a discrete amount in respect to call control events characterized by discrete evidence of availability and by incremental amounts in response to call control events characterized by incremental evidence of availability, whereby said indication of user availability is maintained for a predetermined period of time in an absence of further call control events.

32. A system as claimed in claim 31, interpretation engine prevents said running sum from being updated by said incremental amounts beyond a predetermined default value.

33. A system as claimed in claim 32, wherein said interpretation engine generates an indication of 'available' in the event said running sum exceeds a predetermined upper decision level, 'unavailable' in the event said running sum is below a predetermined lower decision level, and 'indeterminate' in the event said running sum is intermediate said predetermined upper and lower decision levels.

34. A system as claimed in claim 32, wherein said default value is selected to bias said running sum toward said lower decision level.

35. A system as claimed in claim 31, further including the step of generating an indication of said user location based on location information in said call control events.

36. A system as claimed in claim 31, further including the step of generating an indication of said user location based on location information in said call control events.

37. The system of claim 31, wherein said interpretation engine displays said user availability information to said user.

* * * * *